United States Patent [19]

Whitton

[11] Patent Number: 4,742,032

[45] Date of Patent: May 3, 1988

[54] NEUTRALIZATION OF SPENT SOLID PHOSPHORIC ACID CATALYST

[75] Inventor: Norman M. Whitton, Katy, Tex.

[73] Assignee: Conoco Inc., Ponca City, Okla.

[21] Appl. No.: 915,161

[22] Filed: Oct. 3, 1986

[51] Int. Cl.$^4$ .................. B01J 27/28; B01J 38/08; C07C 2/02; C05B 7/00
[52] U.S. Cl. ............................ 502/26; 71/36; 502/54; 502/515; 585/514; 585/529
[58] Field of Search ........... 502/54, 26, 515, 501, 502/503, 504; 585/529, 514, 509; 423/305; 71/36, 51

[56] References Cited

U.S. PATENT DOCUMENTS

| | | | |
|---|---|---|---|
| 2,186,021 | 1/1940 | Holm et al. | 585/514 |
| 2,369,693 | 2/1945 | Tollefson | 502/38 |
| 4,436,900 | 3/1984 | Matsusaki et al. | 528/490 |

FOREIGN PATENT DOCUMENTS 1231658  5/1971  United Kingdom ............... 585/514

Primary Examiner—Paul E. Konopka
Attorney, Agent, or Firm—Richard W. Collins

[57] ABSTRACT

Spent solid phosphoric acid catalyst is neutralized prior to removal from a reactor vessel to avoid generation of toxic dust or acidic washings during catalyst removal.

9 Claims, No Drawings

NEUTRALIZATION OF SPENT SOLID PHOSPHORIC ACID CATALYST

BACKGROUND OF THE INVENTION

1. Field of the Invention

This invention relates to hydrocarbon processing utilizing a solid phosphoric acid catalyst. More particularly, the invention relates to an improved process for removing spent solid phosphoric acid catalyst from a reactor without generation of toxic dust or highly acidic washings.

Solid phosphoric acid catalyst is comprised of phosphoric acid absorbed on a suitable solid carrier material. The catalyst is used in the petroleum refining and petrochemical industries to promote polymerization or combination of olefinic hydrocarbons, for example to polymerize normally gaseous olefins to produce gasoline boiling range liquid product. Petrochemical uses include production of cumene from propylene and benezene, and hexene, heptene, nonene and dodecene from propylene and/or butylene.

The activity of such solid phosphoric acid catalysts declines with use, and the catalyst must periodically be removed and disposed of.

2. The Prior Art

In the past, spent catalyst has often been dumped from a reactor and placed in a landfill, or in some cases slurried for disposal in wastewater. In some cases, spent catalyst has been neturalized with basic material after being dumped from the reactor but prior to disposal. These prior art disposal techniques are not entirely satisfactory from safety and environmental standpoints, as dumping of spent unneutralized catalyst from a reactor generates considerable toxic dust, and slurrying spent catalyst generates acidic washings which create safety and environmental problems.

U.S. Pat. No. 2,369,693 to Tollefson describes a method of regenerating spent phosphate catalyst by burning carbonaceous matter off the catalyst in the presence of amonia. The catalyst described in this reference is ammonium phosphate rather than phosphoric acid, and the regeneration by burning is not similar to the neutralization step of the present invention.

U.S. Pat. No. 4,436,900 to Matsuzaki et al describes deactivating a catalyst with ammonia to stop a reaction at a desired point. Again, this reference does not deal with neutralization of spent catalyst prior to disposal.

SUMMARY OF THE INVENTION

According to the present invention, spent solid phosphoric acid catalyst is neutralized with ammonia prior to removal from a reactor. The neutalized catalyst can then be recovered and disposed of, or can be used as a fertilizer or raw material.

It is an object of this invention to provide a catalyst removal process which is safe and environmentally acceptable.

DESCRIPTION OF THE PREFERRED EMBODIMENT

This invention is applicable to disposal of spent solid phosphoric acid catalysts. For purposes of description, the invention will be described as it would apply to a catalytic polymerization process in which normally gaseous olefins are polymerized to produce gasoline boiling range products.

In such a process, the catalyst is held in a fixed bed, and typical reaciton conditions are 150°–315° C. and 2000–10,000 kPa. The catalyst activity declines with time, and catalyst removal and replacement is necessary. The spent catalyst poses a hazard due to the phosphoric acid content. Generation of toxic dust and/or highly acidic washings accompany conventional catalyst dumping.

According to the most preferred version of the present invention, the spent catalyst is substantially neutralized in the reactor vessel prior to removal of the catalyst. The neutralization agent is ammonia, preferably anhydrous ammonia. Ammonia reacts with the phosphoric acid to produce ammonium phosphate, which is useful as a fertilizer or raw material.

The amount of ammonia used should be at least 1.0 times the stoichiometric amount needed to neutralize the phosphoric acid. Substantial neutralization is considered to have occurred when a slurry of neutralized catalyst in water has a pH of at least 2.0. Preferably, the pH of slurried neutralized catalyst should be from about 5.0 to about 9.0.

The temperature during the neutralization step should be controlled between 38° and 150° C. Higher temperatures result in melting and/or decomposition of the reaction products.

The pressure during the neutralization is not especially critical, but the reaction proceeds better at elevated pressure such as 700 kPa or higher.

A typical process in accordance with the invention will now be described.

In a process in which normally gaseous olefins are polymerized over a fixed bed of solid phosphoric acid catalyst comprising 65 percent by weight phosphoric acid (partially hydrated) adsorbed on an inert solid carrier material, it is determined that the catalyst activity has declined to an unacceptably low level, and that catalyst replacement is due.

The feed to the unit is discontinued, and the reactor is depressured. Feed material and products are removed from the reactor, and anhydrous ammonia in an amount of 1.2 times the stoichiometric amount needed to react with the phosphoric acid is injected while controlling thr reactor temperature between 38° and 150° C. A sample of neutralized catalyst is slurried and tested for pH. A successful neutralization is indicated by a slurry pH of from about 2.0 to about 12.0. Preferably, the slurry pH will be from about 5.0 to about 9.0. If the slurry of neutralized material has an acceptable pH, unreacted ammonia is removed from the reactor, and then the main body of catalyst is removed from the reactor. The neutralized spent acid is predominantly ammonium phosphate, which can be used as a fertilizer.

Basically, the catalyst removal process of this invention is similar to the conventional method of dumping spent phosphoric acid catalyst, with the additional step of neutralizing the phosphoric acid content of the spent catalyst by injection of ammonia under controlled conditions.

The foregoing description is intended to be illustrative of the invention, rather than limiting, and the scope thereof is to be defined by the appended claims.

I claim:

1. A process for neutralization and removal of a fixed bed of spent solid phosphoric acid catalyst material contained in a pressurized reactor vessel used to process hydrocarbon material comprising:

(a) discontinuing introduction of fresh hydrocarbon feed to said reactor vessel;

(b) depressuring said reactor vessel;

(c) removing hydrocarbon feed and products from said reactor vessel;

(d) injecting ammonia into said reactor vessel in an amount and for a time sufficient to substantially neutralize the phosphoric acid content of said catalyst;

(e) removing unreacted ammonia from said reactor vessel; and (f) removing neutralized spent catalyst from said reactor, thereby avoiding generation of toxic dust or highly acidic washings during removal of said spent acid catalyst from said reactor vessel.

2. The process of claim 1 wherein the amount of ammonia added is at least 1.0 times the stoichiometric amount needed to neutralize the phosphoric acid content of said solid catalyst.

3. The process of claim 2 wherein the temperature in said reactor vessel is maintained between 38° and 150° C. during neutralization of said catalyst.

4. The process of claim 3 wherein said ammonia is injected into said reactor vessel in an amount and for a time sufficient that a slurry of neutralized catalyst has a pH of from 5.0 to 9.0.

5. The process of claim 4 wherein said ammonia is anhydrous ammonia.

6. The process of claim 5 wherein said anhydrous ammonia is injected into said reactor vessel in gaseous form.

7. The process of claim 6 wherein said solid phosphoric acid catalyst consists essentially of phosphoric acid on a solid inert adsorbent carrier.

8. The process of claim 7 wherein the pressure in said reactor vessel during a substantial portion of said neutraliation is at least 700 kPa.

9. The process of claim 8 wherein said hydrocarbon material comprises normally gaseous olefinic hydrocarbons which are polymerized to form gasoline boiling range product.

* * * * *